US 9,763,295 B2

(12) United States Patent
Kato

(10) Patent No.: US 9,763,295 B2
(45) Date of Patent: Sep. 12, 2017

(54) SWITCHING CONVERTER AND LIGHTING DEVICE USING THE SAME

(71) Applicant: ROHM CO., LTD., Ukyo-ku, Kyoto (JP)

(72) Inventor: Ryo Kato, Kyoto (JP)

(73) Assignee: ROHM CO., LTD., Ukyo-Ku, Kyoto (JP)

( * ) Notice: Subject to any disclaimer, the term of this patent is extended or adjusted under 35 U.S.C. 154(b) by 0 days.

(21) Appl. No.: 15/168,645

(22) Filed: May 31, 2016

(65) Prior Publication Data

US 2016/0360582 A1    Dec. 8, 2016

(30) Foreign Application Priority Data

Jun. 2, 2015   (JP) .................................. 2015-112046

(51) Int. Cl.
*H05B 33/08* (2006.01)
*H02M 1/32* (2007.01)
*H02M 3/156* (2006.01)

(52) U.S. Cl.
CPC .......... *H05B 33/0815* (2013.01); *H02M 1/32* (2013.01); *H02M 3/156* (2013.01); *H05B 33/0803* (2013.01); *H05B 33/089* (2013.01)

(58) Field of Classification Search
None
See application file for complete search history.

(56) References Cited

U.S. PATENT DOCUMENTS

| | | | | |
|---|---|---|---|---|
| 2009/0174340 | A1* | 7/2009 | Kumagai | H02M 3/155 315/291 |
| 2011/0043139 | A1* | 2/2011 | Shiu | H05B 33/089 315/307 |
| 2012/0212143 | A1* | 8/2012 | Esaki | H05B 33/089 315/192 |
| 2014/0354159 | A1* | 12/2014 | Zhang | H05B 33/0815 315/127 |

FOREIGN PATENT DOCUMENTS

| | | |
|---|---|---|
| JP | 2003153529 A | 5/2003 |
| JP | 2004047538 A | 2/2004 |

* cited by examiner

*Primary Examiner* — Douglas W Owens
*Assistant Examiner* — James H Cho
(74) *Attorney, Agent, or Firm* — Cantor Colburn LLP

(57) ABSTRACT

A switching converter includes: an output circuit including a switching transistor, an inductive element, and a rectifying element configured to rectify a current flowing to the inductive element; a control circuit having a monitor terminal, and configured to drive the switching transistor such that a voltage of the load becomes close to a reference voltage when a voltage of the monitor terminal is higher than the reference voltage, and to drive the switching transistor such that a voltage of the load becomes close to a voltage of the monitor terminal when a voltage of the monitor terminal is lower than the reference voltage; and an abnormality protection circuit configured to monitor a state of the load, the control circuit, peripheral circuits, and the switching converter, and to pull down a voltage of the monitor terminal to a voltage lower than the reference voltage when abnormality is detected.

15 Claims, 11 Drawing Sheets

SWITCHING CONVERTER AND LIGHTING DEVICE USING THE SAME

CROSS-REFERENCE TO RELATED APPLICATION(S)

This application is based upon and claims the benefit of priority from Japanese Patent Application No. 2015-112046, filed on Jun. 2, 2015, the entire contents of which are incorporated herein by reference.

TECHNICAL FIELD

The present disclosure relates to a switching converter.

BACKGROUND

Semiconductor light sources such as light emitting diodes (LEDs) as a liquid crystal backlight or lighting device have become prevalent. FIG. 1 is a block diagram of a lighting device including an LED. A lighting device 500r includes an LED light source 502, a rectifying circuit 504, a smoothing condenser 506, and a switching converter 100r. The LED light source 502 is an LED string, and includes a plurality of LEDs connected in series. The rectifying circuit 504 and the smoothing condenser 506 rectify and smooth a commercial alternating current (AC) voltage $V_{AC}$ to convert it into a DC voltage $V_{DC}$. The switching converter 100r receives the DC voltage $V_{DC}$ as an input voltage $V_{IN}$ and supplies a driving current $I_{LED}$ corresponding to a desired amount of light to the LED light source 502.

The switching converter 100r is a step-down converter, and includes an output circuit 102 and a control circuit 200r. The output circuit 102 includes a smoothing capacitor C1, a rectifying diode D1, a switching transistor M1, an inductor L1, a detection resistor $R_{CS}$, a capacitor C11, and resistors R11 and R12.

During an ON period of the switching transistor M1, a coil current $I_{L1}$ flows to the detection resistor $R_{CS}$ by way of the inductor L1 and the switching transistor M1. A voltage drop (current detection signal) $V_{CS}$ of the detection resistor $R_{CS}$ is fed back to a current detection (CS) terminal of the control circuit 200r. The control circuit 200r generates a pulse signal whose duty ratio is adjusted such that a peak of the current detection signal $V_{CS}$ becomes close to a target voltage corresponding to a target amount of light of the LED light source 502, and switches the switching transistor M1 connected to an OUT terminal. A driving current $I_{LED}$ smoothed from the coil current $I_{L1}$ is supplied to the LED light source 502.

A zero cross detection signal $V_{ZT}$ that is based on a drain voltage $V_D$ of the switching transistor M1 is input to a zero cross detection (ZT) terminal of the control circuit 200r through the capacitor C11 and the resistors R11 and R12. The control circuit 200r detects that the coil current $I_L$ flowing through the inductor L1 becomes zero (zero cross) according to the zero cross detection signal $V_{ZT}$, and turns on the switching transistor M1. Further, the control circuit 200r detects that the current detection signal $V_{CS}$ reaches a target voltage $V_{REF}$, and turns off the switching transistor M1.

A DC voltage $V_{DC}$ is input to a high voltage (VH) terminal of the control circuit 200r, and a capacitor C21 is connected to a power source (VCC) terminal. The control circuit 200r includes a start-up circuit (not shown in FIG. 1, 202 of FIG. 4) between the VH terminal and the VCC terminal. The start-up circuit charges the capacitor C21 when the switching converter 100r is started up.

When a user of the lighting device 500r turns on a switch for lighting on and off the lighting device 500r, the AC voltage $V_{AC}$ is supplied to the rectifying circuit 504 and the voltage $V_{DC}$ of the smoothing condenser 506 increases. In response to turning on the switch, the control circuit 200r is started up. When the control circuit is started up, a start-up current flows from the VH terminal to the capacitor C21 by way of the start-up circuit 202 and the VCC terminal so that the capacitor C21 is charged.

A voltage $V_{CC}$ of the capacitor C21 is a power source voltage of the control circuit 200r. The control circuit 200r is operable when the power source voltage $V_{CC}$ exceeds a predetermined threshold voltage (lowest operating voltage) $V_{UVLO}$, and starts to switch the switching transistor M1.

When the LED light source 502 has a high temperature, a lifespan of the LED light source 502 may be shortened or the reliability of peripheral circuit components may be degraded. Thus, a temperature of the lighting device 500r is monitored using a temperature detection element such as a thermistor, and an overheat protecting function for decreasing the driving current $I_{LED}$ supplied to the LED light source 502 when the temperature of the lighting device 500r increases, and suppressing an additional increase in the temperature is provided. In particular, in a closed type lighting device that is used in an outdoor area, a bathroom, or the like, since heat is easily generated in terms of structure of the lighting device, it is particularly important to consider a temperature.

A negative temperature coefficient (NTC) terminal is installed in the control circuit 200r. A thermistor $R_{NTC}$ is connected between the NTC terminal and a ground terminal. Further, a capacitor $C_{NTC}$ is installed in parallel to the thermistor $R_{NTC}$. At the NTC terminal, a voltage corresponding to a temperature is generated.

For example, the control circuit 200r includes a bias circuit 204 connected to the NTC terminal, and supplies a constant current $I_C$ to the thermistor $R_{NTC}$. A voltage (temperature detection voltage) $V_{NTC}$ of the NTC terminal is given as a following equation:

$$V_{NTC} = R_{NTC} \times I_C$$

The thermistor $R_{NTC}$ has negative temperature characteristics, and a resistance value of the thermistor $R_{NTC}$ decreases as a temperature increases. In other words, the temperature detection signal $V_{NTC}$ is decreased as a temperature increases. In the control circuit 200r, the temperature detection signal $V_{NTC}$ suppresses the driving current $I_{LED}$ according to the terminal voltage $V_{NTC}$ in a region where an ambient temperature Ta is higher than a predetermined threshold temperature $T_{TH}$.

The present inventor reviewed the switching converter 100r of FIG. 1 and recognized the following technical problem. FIG. 2A is a view illustrating a temperature dependency of the temperature detection signal $V_{NTC}$, and FIG. 2B is a view illustrating a temperature dependency of the driving current $I_{LED}$. In a range in which the ambient temperature Ta is lower than the threshold temperature $T_{TH}$, a current is not limited and the driving current $I_{LED}$ maintains a target current $I_{REF}$ (128 mA). When the ambient temperature Ta exceeds the threshold temperature $T_{TH}$, the driving current $I_{LED}$ is clamped according to the current detection signal $V_{NTC}$ and the driving current $I_{LED}$ decreases as a temperature increases.

Here, in the region of Ta>$T_{TH}$, when the ambient temperature Ta is slightly changed, the driving current $I_{LED}$ is significantly changed. This means that it is impossible to control an amount of current of the driving current $I_{LED}$, that is, an amount of light of the LED light source 502, in an overheated state, which is not desirable.

Herein, in order to clarify the technical problem, the lighting device 500r having the LED light source 502 has been described as an example, but in some cases, it may also be intended to set an electrical state of a load in an overheated state or in another abnormal state, even for the switching converter 100r for supplying power to a certain load in applications other than the lighting device 500r.

SUMMARY

The present disclosure provides some embodiments of a switching converter capable of setting an electrical state of a load in an abnormal state.

According to one embodiment of the present disclosure, there is provided a switching converter for supplying power to a load. The switching converter includes: an output circuit including at least a switching transistor, an inductive element, and a rectifying element; a control circuit having a monitor terminal, and configured to drive the switching transistor such that an electrical state of the load becomes close to a target state corresponding to a reference voltage when a voltage of the monitor terminal is higher than the reference voltage, and to drive the switching transistor such that an electrical state of the load becomes close to a state corresponding to a voltage of the monitor terminal when a voltage of the monitor terminal is lower than the reference voltage; and an abnormality protection circuit configured to monitor a state of at least one of the load, the control circuit, peripheral circuits, and the switching converter, and to pull down a voltage of the monitor terminal to a voltage lower than the reference voltage when abnormality is detected.

According to the embodiment, it is possible to set a state of the load in an abnormal state based on a voltage level of the monitor terminal pulled down in the abnormal state.

In some embodiments, the abnormality protection circuit may include a first resistor and a switch installed in series between the monitor terminal and a ground, and may be configured to turn on the switch when the abnormality is detected.

Thus, it is possible to set a state of the load in an overheated state based on a resistance value of the first resistor.

In some embodiments, the abnormality protection circuit may further include a thermistor and a second resistor sequentially installed in series between a power line and the ground, and may be configured to turn ON and OFF of the switch based on a result of comparison between a voltage of a connection node of the thermistor and the second resistor and a predetermined threshold voltage.

In this case, it is possible to set a determination threshold value in an overheated state based on a resistance value of the second resistor.

In some embodiments, the thermistor may be a negative temperature coefficient (NTC) thermistor, and may be arranged on a potential side higher than the second resistor, and the switch may be an NPN-type bipolar transistor or an N-channel metal oxide semiconductor field effect transistor (MOSFET) having a control terminal to which the voltage of the connection node of the thermistor and the second resistor is input.

Thus, it is possible to set a threshold voltage $V_{BE}$ between a base and an emitter of the NPN-type bipolar transistor or a gate threshold voltage $V_{GS(TH)}$ of the MOSFET to a predetermined threshold voltage.

In some embodiments, the control circuit may include a bias circuit configured to bias the first resistor through the monitor terminal.

In some embodiments, the bias circuit may include a current source configured to supply a predetermined current Ic to the first resistor through the monitor terminal. In this case, it is possible to set a voltage of the monitor terminal pulled down to R1×IC.

In some embodiments, the bias circuit may include a third resistor connected to the monitor terminal. In this case, it is possible to set a voltage of the monitor terminal pulled down to $V_{CC} \times R2/(R2+R3)$ using a constant voltage $V_{CC}$ supplied to the third resistor.

In some embodiments, an electrical state of the load may be a current flowing through the load. It is possible to set a current of the load in an abnormal state.

In some embodiments, the control circuit may include a comparator or an error amplifier having a first inverting input terminal connected to the monitor terminal, a second inverting input terminal configured to receive the reference voltage, and a non-inverting input terminal configured to receive a feedback signal indicating an electrical state of the load, and configured to compare a lower value, among a voltage of the first inverting input terminal and a voltage of the second inverting input terminal, with the feedback signal or amplify an error between the lower value and the feedback signal.

In some embodiments, the control circuit may include a quasi-resonant (QR) type modulator.

In some embodiments, the load may be a semiconductor light source. Thus, it is possible to set an amount of light of the semiconductor light source in an abnormal state.

The output circuit may include: an output capacitor installed between an input line and an output line; a diode having a cathode connected to the input line; an inductor installed between the output line and an anode of the diode; and the switching transistor installed between the anode of the diode and the ground.

The output circuit may have a flyback-type topology. The output circuit may have a topology of a buck converter or a boost converter.

According to another embodiment of the present disclosure, there is provided a lighting device. The lighting device may include: a semiconductor light source; and any one of the switching converters, as described above, configured to light the semiconductor light source.

In some embodiments, the lighting device further include: a rectifying circuit configured to rectify an AC voltage; and a smoothing capacitor configured to smooth an output voltage of the rectifying circuit to supply the smoothed output voltage to an input line of the switching converter.

According to still another embodiment of the present disclosure, there is provided a lighting device. The lighting device includes: a semiconductor light source; and a switching converter configured to receive a DC input voltage to light the semiconductor light source. The switching converter include: an output circuit including at least a switching transistor, an inductive element, and a rectifying element; a control circuit having a current detection terminal configured to receive a feedback signal indicating a driving current flowing through the semiconductor light source and a monitor terminal, and configured to drive the switching transistor such that the feedback signal becomes close to a reference voltage when a voltage of the monitor terminal is higher than the reference voltage, and to drive the switching transistor such that the feedback signal becomes close to a state corresponding to a voltage of the monitor terminal when the voltage of the monitor terminal is lower than the reference voltage; a first resistor and a transistor sequentially installed in series between the monitor terminal and a ground; and a negative temperature coefficient (NTC) thermistor and a second resistor sequentially installed in series between a power line and the ground, wherein a voltage of a connection node of the NTC thermistor and the second resistor is input to a control terminal of the transistor.

Further, any combination of the foregoing components or replacement expressions among a method, an apparatus, a system and the like are also effective as embodiments of the present disclosure.

DETAILED DESCRIPTION

Figure 1:
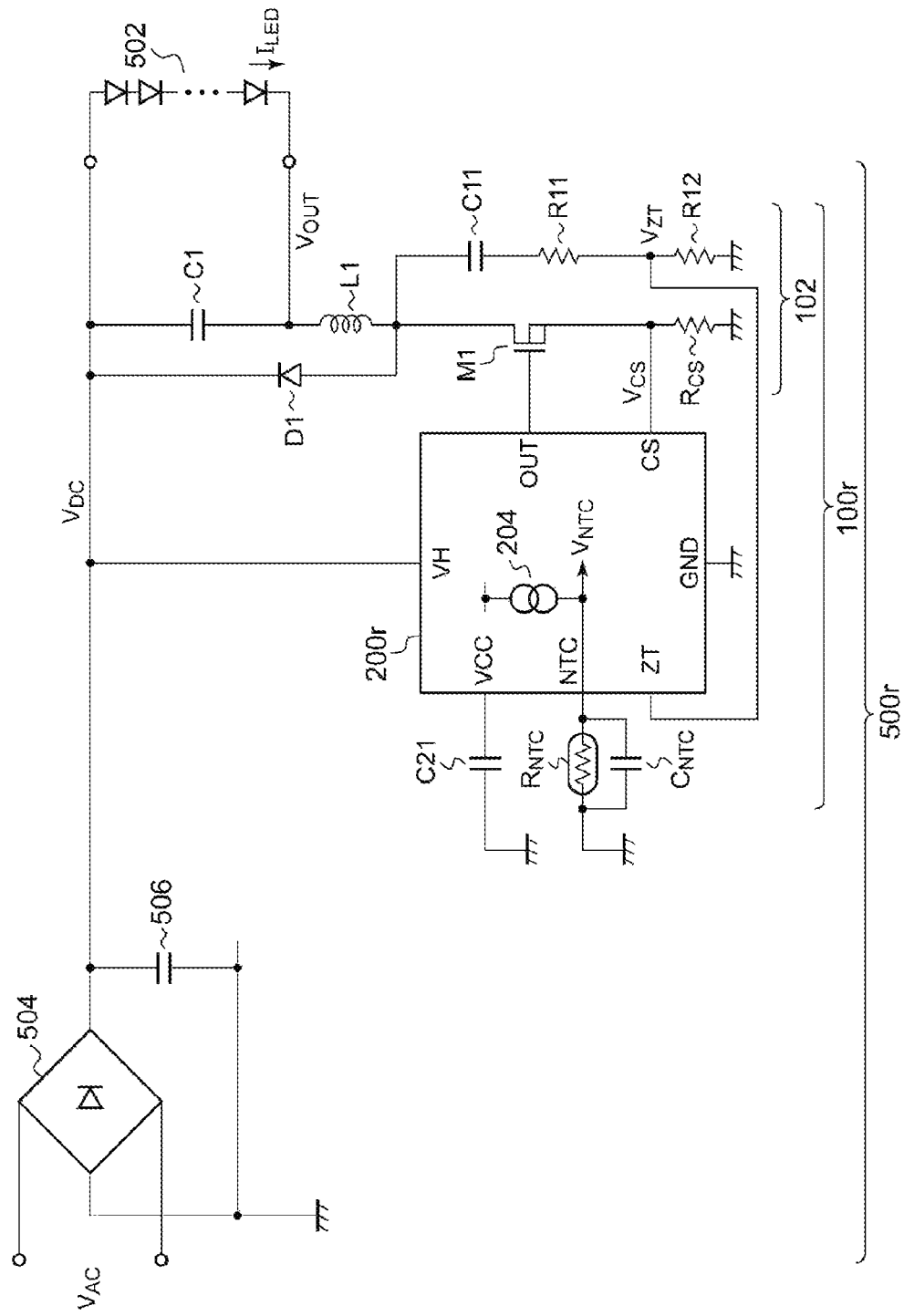
FIG. 1 is a block diagram of a lighting device including an LED.
Figure 2A:
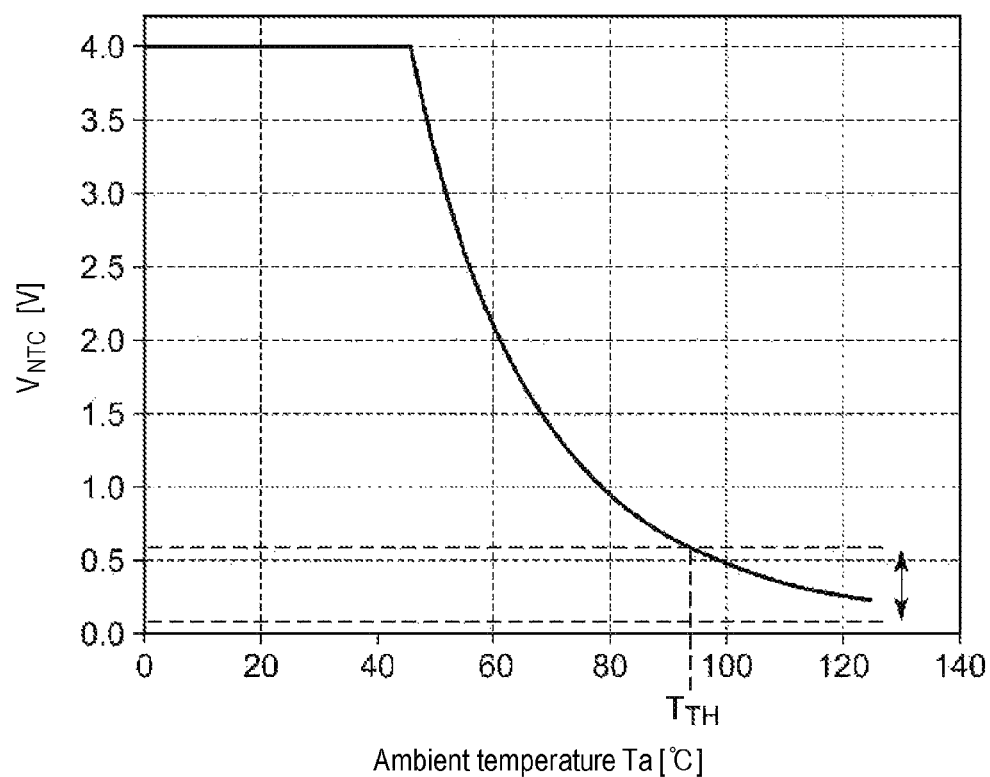
FIG. 2A is a view illustrating a temperature dependency of a temperature detection signal $V_{NTC}$.
Figure 2B:
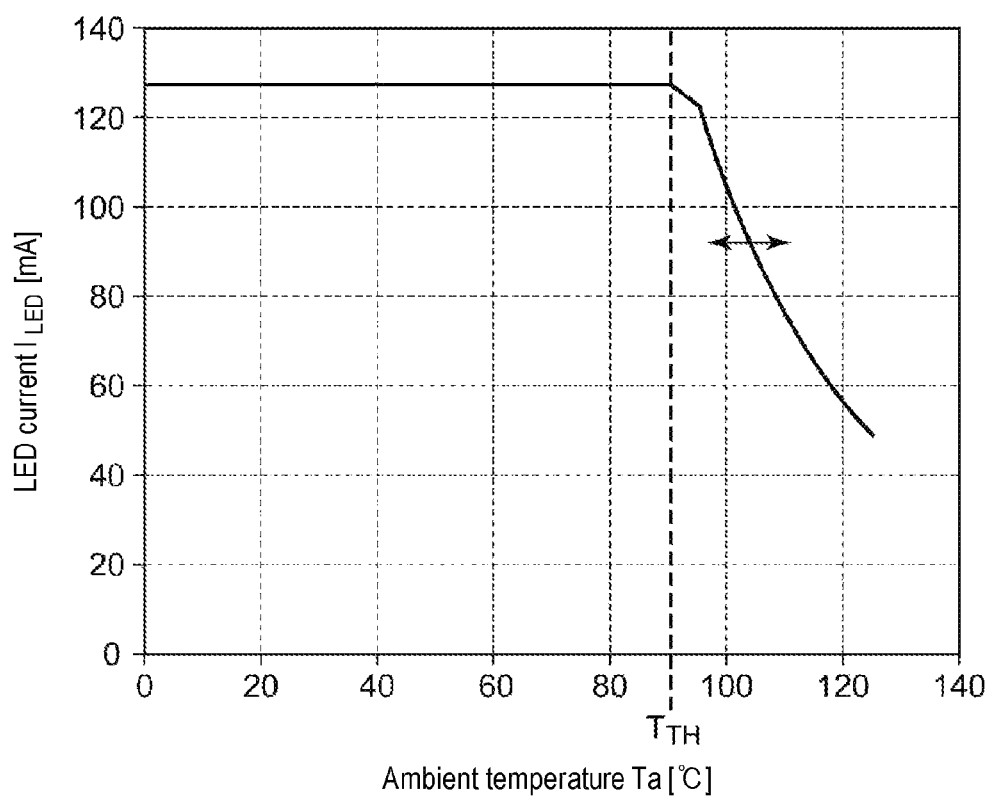
FIG. 2B is a view illustrating a temperature dependency of a driving current $I_{LED}$.

Embodiments of the present disclosure will be now described in detail with reference to the drawings. Like or equivalent components, members, and processes illustrated in each drawing are given like reference numerals and a repeated description thereof will be properly omitted. Further, the embodiments are presented by way of example only, and are not intended to limit the present disclosure, and any feature or combination thereof described in the embodiments may not necessarily be essential to the present disclosure.

In the present disclosure, "a state where a member A is connected to a member B" includes a case where the member A and the member B are physically directly connected or even a case in which the member A and the member B are indirectly connected through any other member that does not affect an electrical connection state thereof.

Similarly, "a state where a member C is installed between a member A and a member B" also includes a case where the member A and the member C or the member B and the member C are indirectly connected through any other member that does not affect an electrical connection state, in addition to a case in which the member A and the member C or the member B and the member C are directly connected.

Figure 3:
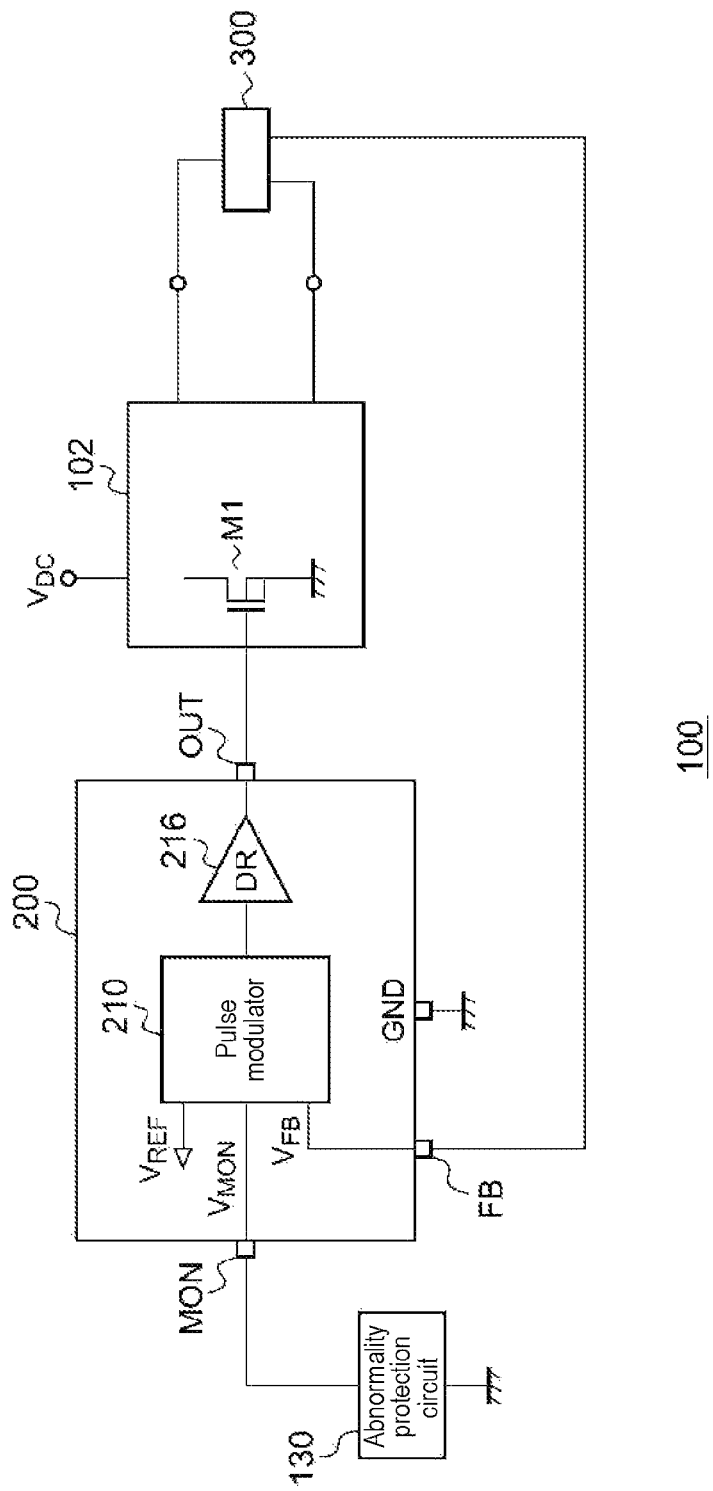
FIG. 3 is a circuit diagram of a switching converter including a control circuit according to an embodiment of the present disclosure.

FIG. 3 is a circuit diagram of a switching converter 100 including a control circuit 200 according to an embodiment of the present disclosure. The switching converter 100 includes an output circuit 102, a control circuit 200, and an abnormality protection circuit 130, and supplies power to a load 300. The switching converter 100 may drive the load 300 with a voltage or a constant current.

The output circuit 102 includes at least an inductive element (not shown), a switching transistor M1 for switching a voltage applied to the inductive element, and a rectifying element (not shown) for rectifying a current flowing to the inductive element. The topology of the output circuit 102 is not particularly limited and includes a boost (step-up) converter, a buck (step-down) converter, a boost-buck converter, a flyback converter, a forward converter, and the like.

The control circuit 200 has an output (OUT) terminal, a monitor (MON) terminal, a feedback (FB) terminal, and a ground (GND) terminal, and is a functional integrated circuit (IC) that is integrated on a single semiconductor substrate. The switching transistor M1 is connected to the OUT terminal. A feedback signal $V_{FB}$ that directly or indirectly indicates an electrical state of the load 300 is input to the FB terminal. The GND terminal is grounded. An electrical state of the load 300 as a target of feedback may be, for example, a voltage applied to the load 300, a current (load current or driving current) flowing through the load 300, a voltage of a predetermined node of the load 300, or the like.

When a voltage $V_{MON}$ of the MON terminal is higher than a reference voltage $V_{REF}$, the control circuit 200 drives the switching transistor M1 such that the feedback signal $V_{FB}$ becomes close to the reference voltage $V_{REF}$, that is, an electrical state of the load 300 becomes close to a target state corresponding to the reference voltage $V_{REF}$. Further, when the voltage $V_{MON}$ of the MON terminal is lower than the reference voltage $V_{REF}$, the control circuit 200 drives the switching transistor M1 such that the feedback signal $V_{FB}$ becomes close to the voltage $V_{MON}$, that is, an electrical state of the load 300 becomes close to a state corresponding to the voltage $V_{MON}$ of the MON terminal.

For example, the control circuit 200 includes a pulse modulator 210 and a driver 216. When $V_{MON} > V_{REF}$, the pulse modulator 210 generates a pulse signal S11 whose duty ratio is changed such that the feedback signal $V_{FB}$ becomes close to the reference voltage $V_{REF}$. Further, when $V_{MON} < V_{REF}$, the pulse modulator 210 adjusts the duty ratio of the pulse signal S11 such that the feedback signal $V_{FB}$ becomes close to the voltage $V_{MON}$. The driver 216 switches the switching transistor M1 according to the pulse signal S11. A configuration and a modulation scheme of the pulse modulator 210 are not particularly limited.

The abnormality protection circuit 130 monitors a state of at least one of the load 300, the control circuit 200, peripheral circuits, and a switching converter to determine whether abnormality is detected. The abnormality to be detected by the abnormality protection circuit 130 may include overvoltage abnormality, overcurrent abnormality, short failure, open failure, a system error, and the like, in addition to the overheat abnormality.

In a normal state, the voltage $V_{MON}$ of the MON terminal is set to be higher than the reference voltage $V_{REF}$. When abnormality is detected, the abnormality protection circuit 130 pulls down the voltage $V_{MON}$ of the MON terminal to a voltage $V_L$ lower than the reference voltage $V_{REF}$.

The basic configuration of the switching converter 100 has been described above. Next, an operation of the switching converter 100 will be described. In a normal state, the MON terminal is not pulled down, so that an electrical state of the load 300 is stabilized to a target state corresponding to the reference voltage $V_{REF}$. Meanwhile, in case of abnormality, the MON terminal is pulled down to the voltage $V_L$ having a predetermined level lower than that of the $V_{REF}$, and as a result, an electrical state of the load 300 is stabilized to a protective state corresponding to the voltage $V_L$.

According to this switching converter 100, a state of the load 300 may be set in an abnormal state according to the predetermined voltage level $V_L$ of the MON terminal pulled down in the abnormal state. In other words, in the abnormal state, since the voltage of the MON terminal is fixed to a predetermined level, a driving state of the load is stabilized even though a temperature is changed.

The present disclosure is recognized through the block diagram and the circuit diagram of FIG. 3, and encompasses various devices and circuits derived from the above description and is not limited to a specific configuration. Hereinafter, a more specific configuration example will be described in order to help and clarify the understanding of the essence and circuitry operation of the present disclosure, rather than to narrow the scope of the present disclosure.

Figure 4:
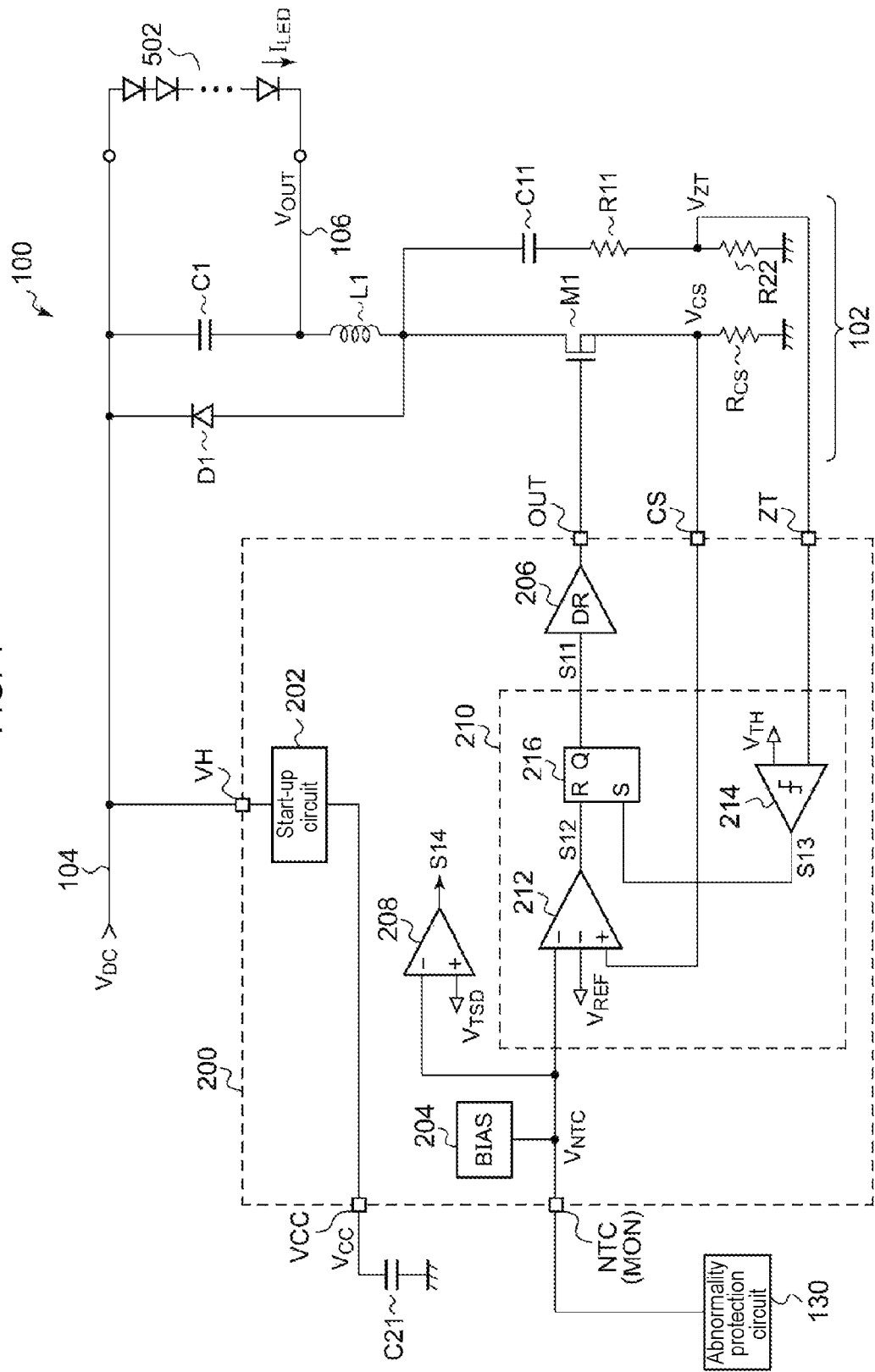
FIG. 4 is a circuit diagram of a switching converter including the control circuit according to the embodiment of the present disclosure.

FIG. 4 is a circuit diagram of the switching converter 100 including the control circuit 200 according to the embodiment of the present disclosure. The switching converter 100 is used in the lighting device 500r, like in FIG. 1, and the LED light source 502 is connected as a load to the switching converter 100. The switching converter 100 steps down the DC voltage $V_{DC}$ input to the input line 104 and outputs an output voltage $V_{OUT}$ to the output line 106. A configuration of the output circuit 102 is the same as that of FIG. 1.

The control circuit 200 stabilizes a current (driving current) $I_{LED}$ of the LED light source 502 as an electrical state of the LED light source 502 to a target level.

The control circuit 200 includes a start-up circuit 202, a bias circuit 204, a driver 206, a comparator 208, and a pulse modulator 210. The pulse modulator 210 is a quasi-resonant (QR) type modulator, and generates a pulse signal S11 according to the current detection signal $V_{CS}$ and the zero cross detection signal $V_{ZT}$. Specifically, when the current detection signal $V_{CS}$ reaches the reference voltage $V_{REF}$ during an ON time of the switching transistor M1, the pulse modulator 210 sets the pulse signal S11 to an OFF level (for example, low level), and when the zero cross detection signal $V_{ZT}$ crosses the threshold voltage $V_{TH}$ during an OFF time of the switching transistor M1, the pulse modulator 210 sets the pulse signal S11 to an ON level (for example, high level).

The pulse modulator 210 includes, for example, comparators 212 and 214, and an SR flip-flop 216. The comparator 212 compares the current detection signal $V_{CS}$ with the reference signal $V_{REF}$, and when $V_{CS} > V_{REF}$, the comparator 212 asserts (for example, high level) a reset signal S12. The comparator 214 compares the zero cross detection signal $V_{ZT}$ with the threshold voltage $V_{TH}$ near zero, and when $V_{ZT} < V_{TH}$, the comparator 214 asserts (for example, high level) a set signal S13. The SR flip-flop 216 receives the reset signal S12 at a reset terminal and receives the set signal S13 at a set terminal to generate the pulse signal S11 having a level that transitions according to the assertion of the pulse signal S11 and the reset signal S12. The driver 206 switches the switching transistor M1 according to the pulse signal S11.

A thermistor $R_{NTC}$ is connected to the NTC terminal intended for overheat protection. The NTC terminal corresponds to the MON terminal of FIG. 3, and a voltage (referred to as a temperature detection signal) $V_{NTC}$ of the NTC terminal corresponds to the voltage $V_{MON}$ of FIG. 3. The bias circuit 204 biases the NTC terminal.

Two inverting input terminals are installed in the comparator 212, and the reference voltage $V_{REF}$ is input to one side of the two inverting input terminals and the temperature detection signal $V_{NTC}$ is input to the other side of the two inverting input terminals. When the current detection signal $V_{CS}$ exceeds a lower value among $V_{NTC}$ and $V_{REF}$, the comparator 212 asserts the reset signal S12.

The comparator 208 compares the temperature detection signal $V_{NTC}$ with a thermal shutdown threshold voltage $V_{TSD}$, and when $V_{NTC} < V_{TSD}$, the comparator 208 asserts (for example, high level) the thermal shutdown signal S14.

In a normal state, the voltage $V_{NTC}$ of the terminal NTC is kept at a voltage level $V_H$ higher than the reference voltage $V_{REF}$ by the bias circuit 204. The abnormality protection circuit 130 monitors the temperature Ta, and when the temperature Ta exceeds the predetermined threshold value $T_{TH}$, the abnormality protection circuit pulls down the voltage $V_{NTC}$ of the NTC terminal to a voltage level $V_L$ lower than the reference voltage $V_{REF}$.

Figure 5:
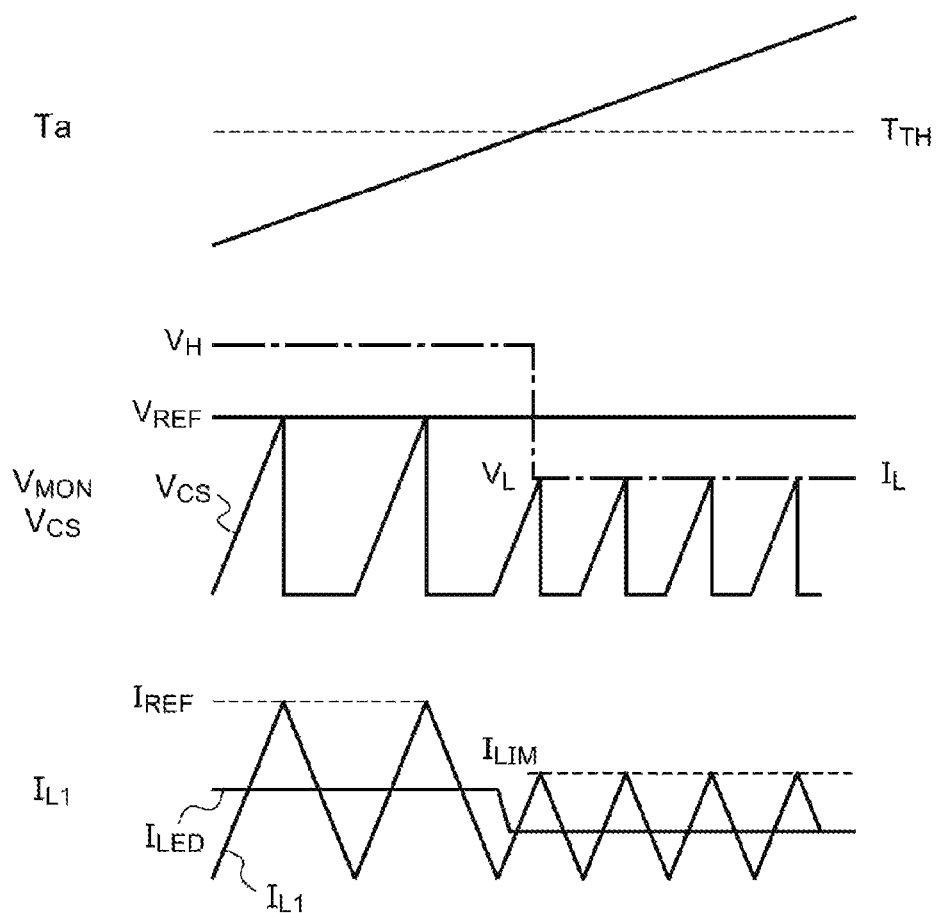
FIG. 5 is an operational waveform view of the control circuit of FIG. 4.

FIG. 5 is an operational waveform view of the control circuit 200 of FIG. 4. The vertical axis and the horizontal axis of the waveform views or time charts herein are appropriately scaled up and down to facilitate understanding, and also, respective waveforms illustrated are simplified, exaggerated, or emphasized to facilitate understanding. In the normal state of $Ta < T_{TH}$, $V_{NTC} > V_{REF}$, and a peak of a coil current $I_{L1}$ is kept at the target current $I_{REF}$ corresponding to the reference voltage $V_{REF}$. In case of the overheat abnormality of $Ta > T_{TH}$, $V_{NTC} < V_{REF}$, and a peak of the coil current $I_{L1}$ is a current amount $I_{LIM}$ corresponding to $V_L$. Thus, it is possible to suppress a load current $I_{LED}$.

Figure 6A:
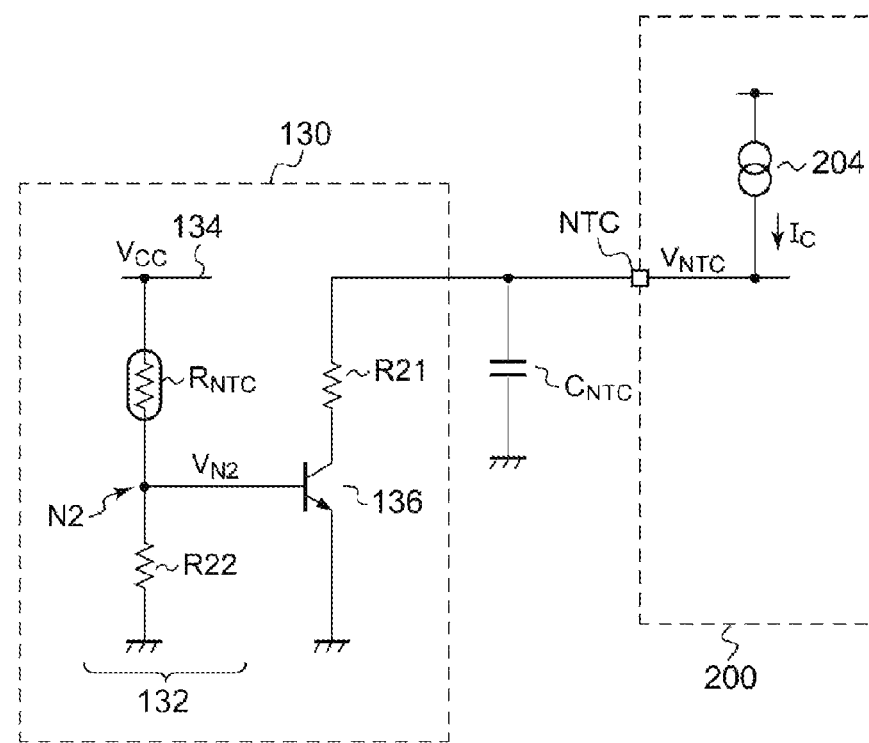
FIGS. 6A and 6B are circuit diagrams illustrating configuration examples of an abnormality protection circuit and a control circuit.
Figure 6B:
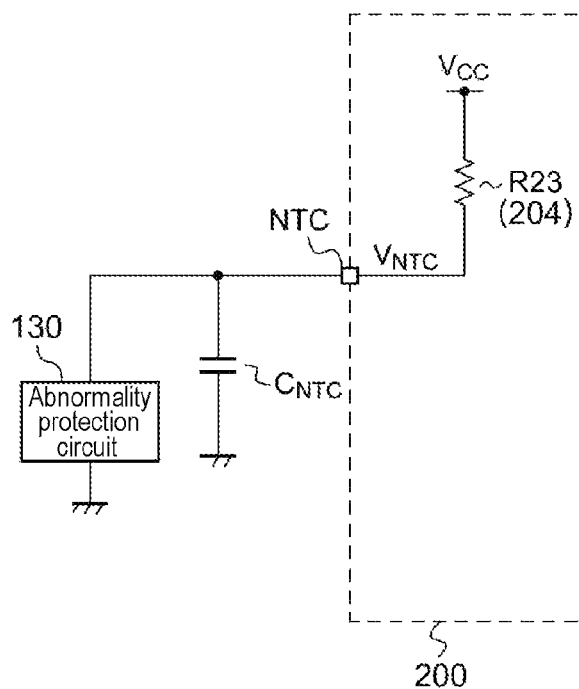

FIGS. 6A and 6B are circuit diagrams illustrating configuration examples of the abnormality protection circuit 130 and the control circuit 200. The abnormality protection circuit 130 includes a first resistor R21 and a switch 136 installed in series between the NTC terminal corresponding to a monitor terminal and a ground. When the abnormality protection circuit 130 detects abnormality, it turns on the switch 136. As the switch 136, an NPN-type bipolar transistor or an N-channel MOSFET may be used. In a normal state, the switch 136 is turned off and the voltage $V_{NTC}$ of the NTC terminal is pulled up to a high level voltage $V_H$ higher than that of the reference voltage $V_{REF}$. When the switch 136 is turned on in an abnormal state, the first resistor R21 is inserted between the monitor terminal NTC and the ground.

The abnormality protection circuit 130 includes an abnormality detection circuit 132. The abnormality detection circuit 132 includes a thermistor $R_{NTC}$ and a second resistor R22 sequentially installed in series between a power line 134 and the ground. The abnormality protection circuit 130 turns ON and OFF of the switch 136 based on a result of the comparison between a voltage $V_{N2}$ of a connection node N2 of the thermistor $R_{NTC}$ and the second resistor R22 and a predetermined threshold voltage.

More specifically, the thermistor $R_{NTC}$ is a negative temperature coefficient (NTC) thermistor and arranged on a potential side higher than the second resistor R22. As described above, the switch 136 is an NPN-type bipolar transistor or an N-channel MOSFET, and the voltage $V_{N2}$ of the connection node N2 is input to the control terminal of the switch 136. When the temperature Ta increases, a resistance value of the thermistor $R_{NTC}$ decreases and the voltage $V_{N2}$ increases. Further, when the voltage $V_{N2}$ exceeds a threshold value $V_{BE}$ (0.6-0.7V) between a base and an emitter of the switch 136, the switch 136 turns on.

The control circuit 200 of FIG. 6A includes a constant current source for generating a constant current $I_C$ as the bias circuit 204. In an abnormal state, the voltage $V_L$ of the NTC terminal is $V_L=I_C \times R21$. In other words, it is possible to set a load current $I_{LIM}$ in the abnormal state based on the resistance value of the first resistor R21.

The control circuit 200 of FIG. 6B includes a bias circuit 204 and a third resistor R23 connected to the NTC terminal. In an abnormal state, the voltage $V_L$ of the NTC terminal is $V_L=V_{CC} \times R21/(R21+R23)$. In other words, it is possible to set a load current $I_{LIM}$ in the abnormal state based on the resistance value of the first resistor R21.

Figure 7:
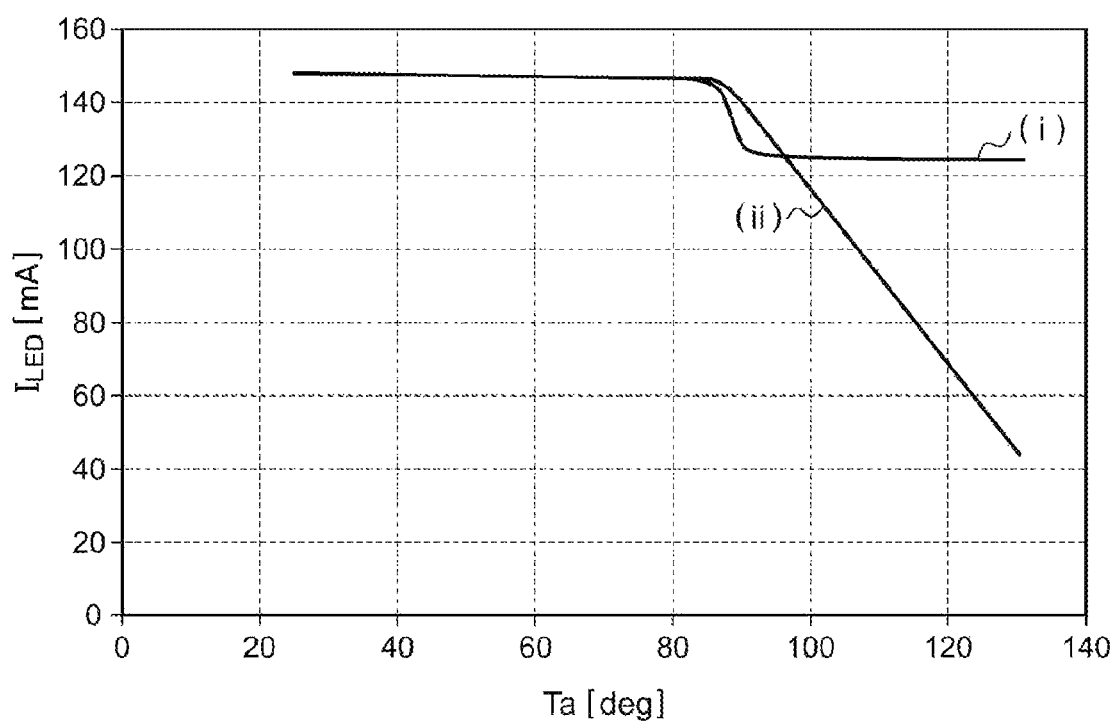
FIG. 7 is a view illustrating a relationship between a temperature Ta and a driving current $I_{LED}$.

The configuration example of the abnormality protection circuit 130 has been described above. FIG. 7 is a view illustrating a relationship between the temperature Ta and the driving current $I_{LED}$. In FIG. 7, (i) indicates the load current $I_{LED}$ in the switching converter 100 according to the embodiment, and (ii) indicates the load current $I_{LED}$ in the switching converter 100r of FIG. 1. According to the switching converter 100 of the embodiment, the threshold temperature $T_{TH}$ may be set according to the thermistor $R_{NTC}$ and the resistor R22, and in an overheated state of $Ta>T_{TH}$, the driving current $I_{LED}$ may be set according to the resistor R21.

It is to be understood by those skilled in the art that the embodiments are merely illustrative and may be variously modified by any combination of the components or processes, and the modifications are also within the scope of the present disclosure.

Hereinafter, these modifications will be described.

First Modification

In the switching converter 100 of FIG. 4, an auxiliary winding coupled to the inductor L1 may be installed, instead of the capacitor C11 and the resistors R11 and R22, and a zero cross detection signal $V_{ZT}$ that is based on a voltage generated by the auxiliary winding is input to the ZT terminal of the control circuit 200. Further, with this configuration, it is possible to realize a quasi-resonance mode.

Second Modification

The control scheme of the switching converter 100 is not limited to the quasi-resonance mode, and a hysteresis control (Bang-Bang control), a PWM control (or PFM control) of a voltage mode, a PWM control (or PFM control) of a current mode, or the like may also be employed.

Third Modification

Figure 8:
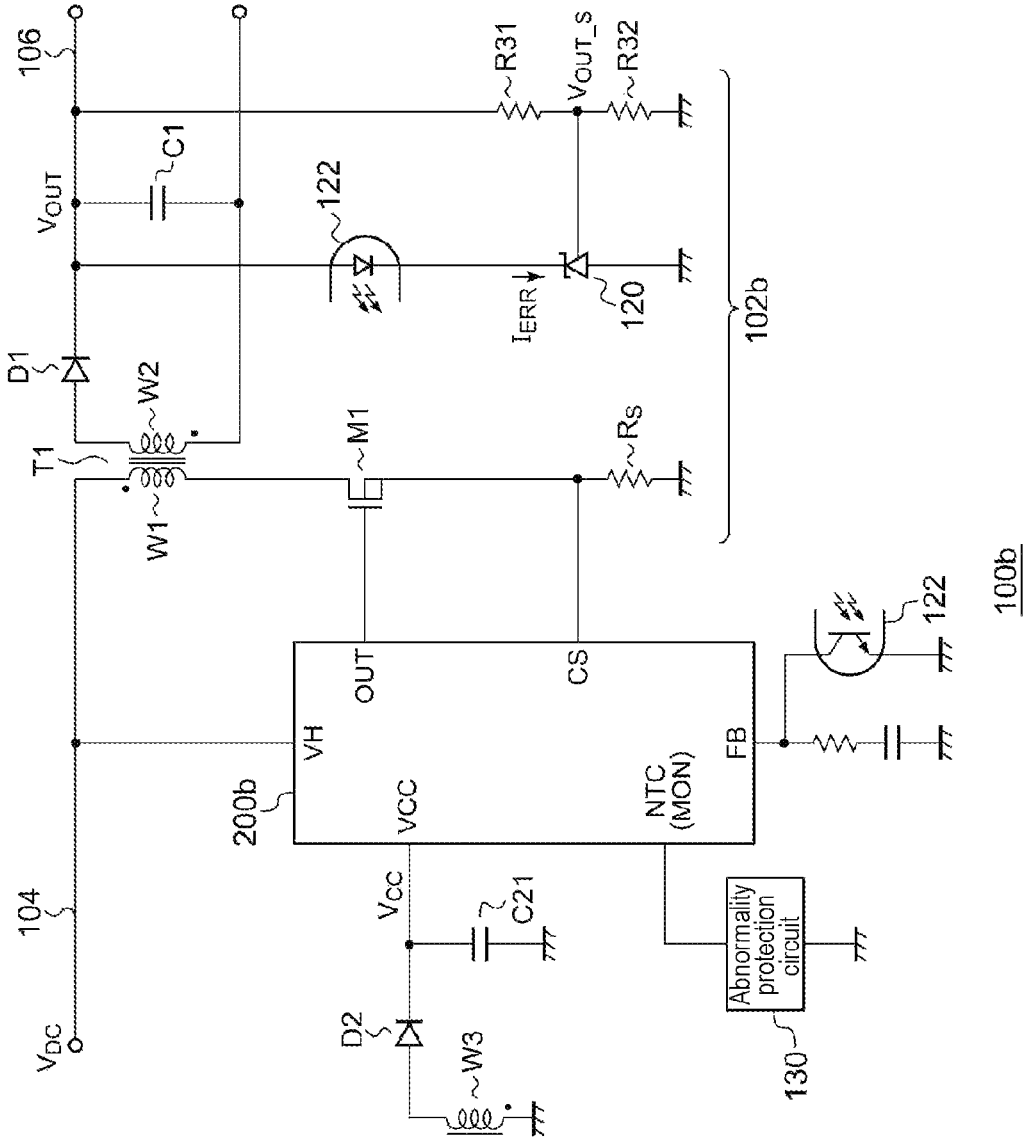
FIG. 8 is a circuit diagram of a switching converter according to a third modification.

The topology of the switching converter 100 and the type of the load are not limited to those of FIG. 4. FIG. 8 is a circuit diagram of a switching converter 100b according to a third modification. In an output circuit 102b, the switching converter 100b has a flyback-type topology and includes a transformer T1, a diode D1, a smoothing capacitor C1, resistors R31 and R32, a shunt regulator 120, and a photocoupler 122.

A control circuit 200b is a controller of a flyback converter. A basic configuration of the control circuit 200b is the same as that of the control circuit 200 of FIG. 3, but a voltage mode, a peak current mode, or an average current mode may be employed in the pulse modulator 210 and a configuration of the control circuit is not particularly limited. A capacitor 21, a diode D2, and an auxiliary winding W3 are connected to a VCC terminal. The auxiliary winding W3 is coupled to a primary winding W1 and a secondary winding W2, and the auxiliary winding W3, the diode D2, and the capacitor C21 form the converter. During a period in which the switching transistor M1 is switched, a DC voltage $V_{CC}$ in proportion to an output voltage $V_{OUT}$ is generated at the VCC terminal.

An output voltage $V_{OUT_S}$ divided by the resistors R31 and R32 is input to an REF terminal of the shunt regulator 120. The shunt regulator 120 generates a current $I_{ERR}$ corresponding to an error between the voltage $V_{OUT_S}$ and the reference voltage $V_{REF}$ to drive a light emitting device of the photocoupler 122. A feedback current $I_{FB}$ corresponding to the output voltage $V_{OUT_S}$ flows to a light receiving device of the photocoupler 122. A feedback voltage $V_{FB}$ corresponding to the feedback current $I_{FB}$ is generated at the FB terminal. The control circuit 200b drives the switching transistor M1 with a duty ratio corresponding to the feedback voltage $V_{FB}$. The abnormality protection circuit 130 is connected to the monitor (NTC) terminal and pulls down a voltage of the NTC terminal in an abnormal state.

Further, in the flyback converter, it is possible to set a driving state of the load in an abnormal state. The switching converter 100b of FIG. 8 may be appropriately used in an AC/DC converter, an AC adapter, or the like.

Fourth Modification

The switching converter 100 may be a buck converter or a boost converter, and the topology of the output circuit 102 may be determined according to the type of the converter. Further, a synchronous rectification type, rather than a diode rectification type, may be used.

Fifth Modification

In the embodiment, abnormality detection using a thermistor has been described mainly based on an overheated state as an abnormal state. In addition, as a method for detecting an overheated state, the use of temperature dependency of a forward voltage $V_F$ of a diode, or the like may also be used. Further, a portion or all of the abnormality protection circuit 130 may be integrated on the same chip as the control circuit 200.

In the abnormality protection circuit 130, a voltage of the monitor terminal may be changed according to overvoltage abnormality, overcurrent abnormality, short failure, open failure, or a system error, in addition to overheat abnormality. In this case, the abnormality detection circuit 132 of the abnormality protection circuit 130 may be configured by using a comparator which compares a signal indicative of a current, a voltage, or the like of a monitoring target with a predetermined threshold value. As the abnormality detection circuit 132, a device such as an overvoltage protecting (OVP) circuit or an overcurrent protecting (OCP) circuit incorporated in the control circuit 200 may also be used.

Further, the control circuit 200 has an alarm terminal, and when the abnormality detection circuit therein detects abnormality, a voltage of the alarm terminal is asserted to (a predetermined level). In this case, ON and OFF of the switch 136 of the abnormality protection circuit 130 may be switched according to a signal of the alarm terminal.

Sixth Modification

In the embodiment, the case in which the LED light source 502 is an LED string has been described, but the type of the load is not particularly limited Further, a combination of the foregoing embodiment and any of the modifications is effective as an aspect of the present disclosure.

Figure 9A:
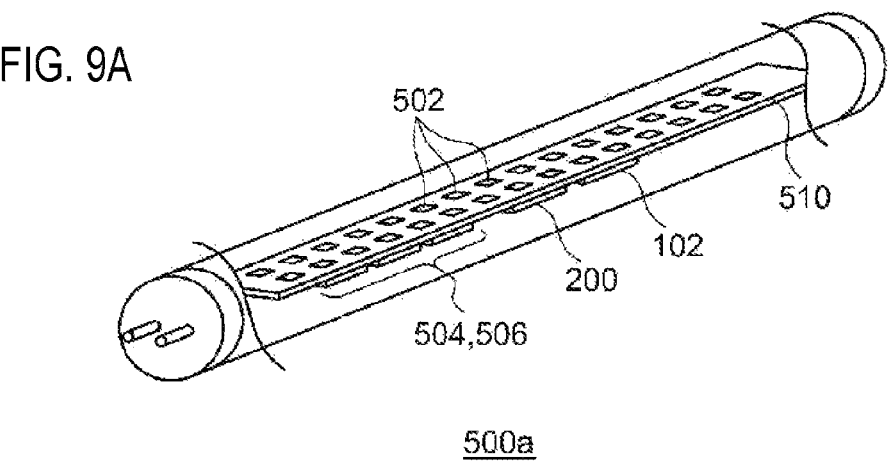
FIGS. 9A to 9C are views illustrating specific examples of a lighting device.
Figure 9B:
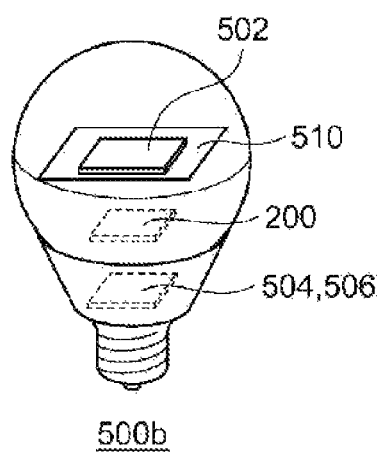
Figure 9C:
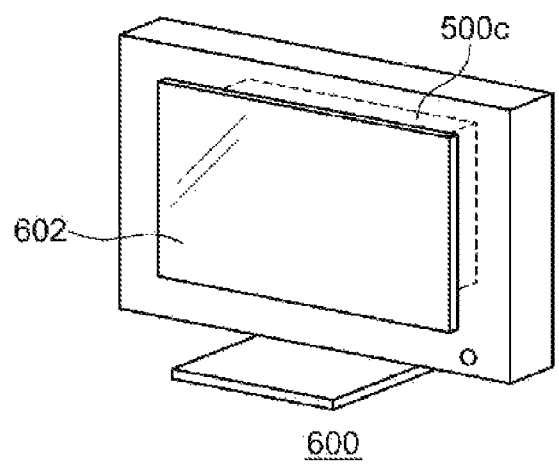

FIGS. 9A to 9C are views illustrating specific examples of the lighting device 500. In FIGS. 9A to 9C, all the components are not shown and some of them are omitted. A lighting device 500a of FIG. 9A is a tubular LED lighting. A plurality of LED devices constituting an LED string as the LED light source 502 are laid out on a board 510. A rectifying circuit 504, a control circuit 200, an output circuit 102, and the like are mounted on the board 510.

A lighting device 500b of FIG. 9B is a bulb-type LED lighting. An LED module as the LED light source 502 is mounted on a board 510. A control circuit 200 and a rectifying circuit 504 are mounted within the housing of the lighting device 500b.

A lighting device 500c of FIG. 9C is a backlight incorporated in a liquid crystal display (LCD) 600. The lighting device 500c irradiates the rear of a liquid crystal panel 602.

Alternatively, the lighting device may be used for ceiling lights. In this manner, the lighting device may be used for various applications.

According to some embodiments of the present disclosure, it is possible to set an electrical state of a load in an abnormal state.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A switching converter for supplying power to a load, comprising:
   an output circuit comprising a switching transistor, an inductive element, and a rectifying element configured to rectify a current flowing to the inductive element;
   a control circuit having a monitor terminal, and configured to drive the switching transistor such that an electrical state of the load becomes close to a target state corresponding to a reference voltage when a voltage of the monitor terminal is higher than the reference voltage, and to drive the switching transistor such that an electrical state of the load becomes close to a state corresponding to a voltage of the monitor terminal when a voltage of the monitor terminal is lower than the reference voltage; and
   an abnormality protection circuit configured to monitor a state of at least one of the load, the control circuit, peripheral circuits, and the switching converter, and to pull down a voltage of the monitor terminal to a voltage lower than the reference voltage when abnormality is detected,
   wherein the abnormality protection circuit comprises a first resistor and a switch installed in series between the monitor terminal and a ground, and is configured to turn on the switch when the abnormality is detected, and
   wherein the abnormality protection circuit further comprises a thermistor and a second resistor sequentially installed in series between a power line and the ground, and is configured to turn ON and OFF of the switch based on a result of comparison between a voltage of a connection node of the thermistor and the second resistor and a predetermined threshold voltage.

2. The switching converter of claim 1, wherein the thermistor is a negative temperature coefficient (NTC) thermistor, and is arranged on a potential side higher than the second resistor, and
   the switch is an NPN-type bipolar transistor or an N-channel metal oxide semiconductor field effect transistor (MOSFET) having a control terminal to which the voltage of the connection node of the thermistor and the second resistor is input.

3. The switching converter of claim 1, wherein an electrical state of the load corresponds to a current flowing through the load.

4. The switching converter of claim 1, wherein the control circuit comprises a comparator or an error amplifier having a first inverting input terminal connected to the monitor terminal, a second inverting input terminal configured to receive the reference voltage, and a non-inverting input terminal configured to receive a feedback signal indicating an electrical state of the load, and configured to compare a lower value, among a voltage of the first inverting input terminal and a voltage of the second inverting input terminal, with the feedback signal or amplify an error between the lower value and the feedback signal.

5. The switching converter of claim 1, wherein the control circuit comprises a quasi-resonant (QR) type modulator.

6. The switching converter of claim 1, wherein the load is a semiconductor light source.

7. The switching converter of claim 1, wherein the output circuit comprises:
   an output capacitor installed between an input line and an output line;
   a diode having a cathode connected to the input line;
   an inductor installed between the output line and an anode of the diode; and
   the switching transistor installed between the anode of the diode and the ground.

8. The switching converter of claim 1, wherein the output circuit has a flyback-type topology.

9. The switching converter of claim 1, wherein the output circuit has a topology of a buck converter or a boost converter.

10. A lighting device, comprising:
    a semiconductor light source; and
    the switching converter of claim 1, configured to light the semiconductor light source.

11. The lighting device of claim 10, further comprising:
    a rectifying circuit configured to rectify an AC voltage; and
    a smoothing capacitor configured to smooth an output voltage of the rectifying circuit to supply the same to an input line of the switching converter.

12. A switching converter for supplying power to a load, comprising:
    an output circuit comprising a switching transistor, an inductive element, and a rectifying element configured to rectify a current flowing to the inductive element;
    a control circuit having a monitor terminal, and configured to drive the switching transistor such that an electrical state of the load becomes close to a target state corresponding to a reference voltage when a voltage of the monitor terminal is higher than the reference voltage, and to drive the switching transistor such that an electrical state of the load becomes close to a state corresponding to a voltage of the monitor terminal when a voltage of the monitor terminal is lower than the reference voltage; and an abnormality protection circuit configured to monitor a state of at least one of the load, the control circuit, peripheral circuits, and the switching converter, and to pull down a voltage of the monitor terminal to a voltage lower than the reference voltage when abnormality is detected, wherein the abnormality protection circuit comprises a first resistor and a switch installed in series between the monitor terminal and a ground, and is configured to turn on the switch when the abnormality is detected, and wherein the control circuit further comprises a bias circuit configured to bias the first resistor through the monitor terminal.

13. The switching converter of claim 12, wherein the bias circuit comprises a current source configured to supply a predetermined current to the first resistor through the monitor terminal.

14. The switching converter of claim 12, wherein the bias circuit comprises a third resistor connected to the monitor terminal.

15. A lighting device, comprising:

a semiconductor light source; and a switching converter configured to receive a DC input voltage to light the semiconductor light source, wherein the switching converter comprises:

an output circuit comprising a switching transistor, an inductive element, and a rectifying element;

a control circuit having a current detection terminal configured to receive a feedback signal indicating a driving current flowing through the semiconductor light source and a monitor terminal, and configured to drive the switching transistor such that the feedback signal becomes close to a reference voltage when a voltage of the monitor terminal is higher than the reference voltage, and to drive the switching transistor such that the feedback signal becomes close to a state corresponding to a voltage of the monitor terminal when the voltage of the monitor terminal is lower than the reference voltage;

a first resistor and a transistor sequentially installed in series between the monitor terminal and a ground; and a negative temperature coefficient (NTC) thermistor and a second resistor sequentially installed in series between a power line and the ground, and wherein a voltage of a connection node of the NTC thermistor and the second resistor is input to a control terminal of the transistor.

* * * * *